UNITED STATES PATENT OFFICE.

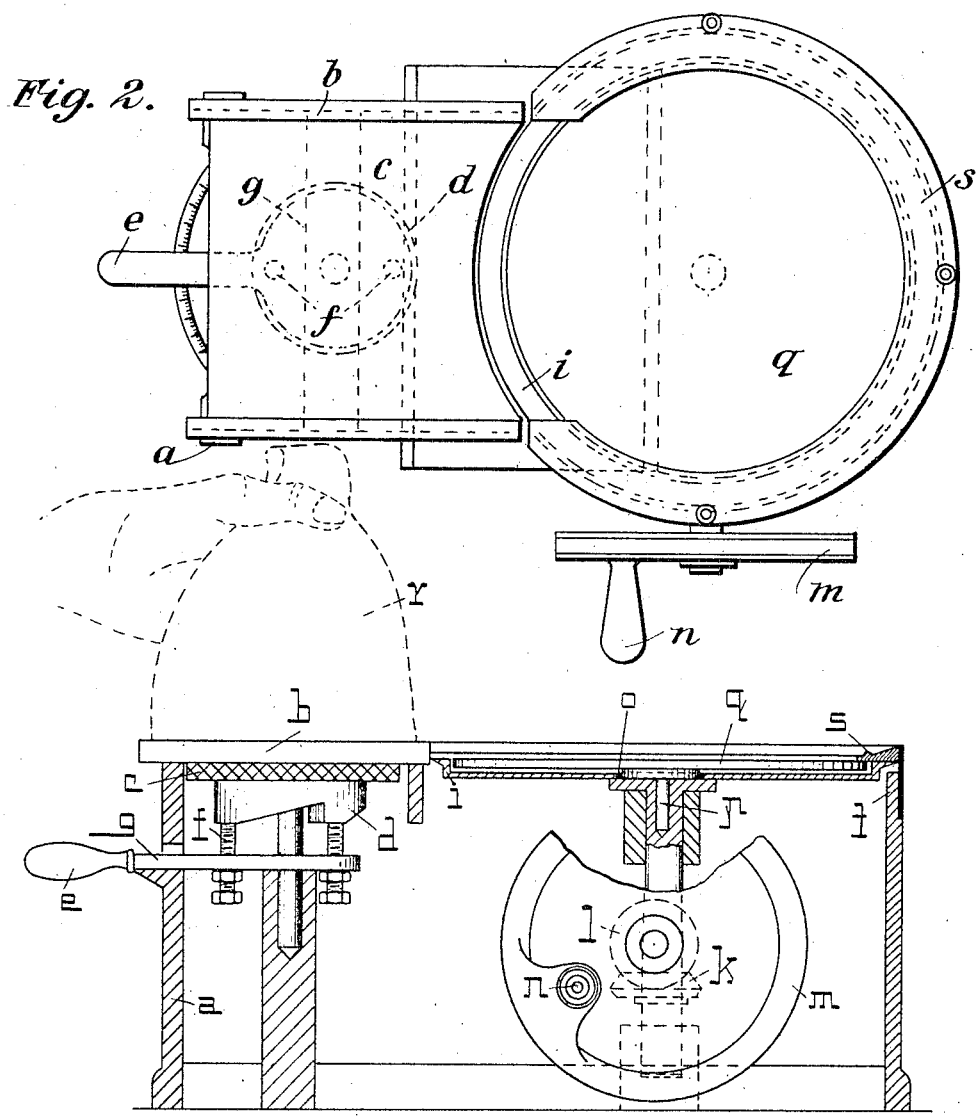

LEO ANSCHEL, OF DORTMUND, GERMANY.

ROTATING DISK CUTTING-MACHINE.

1,020,873.  Specification of Letters Patent.  Patented Mar. 19, 1912.

Application filed September 10, 1909. Serial No. 517,149.

*To all whom it may concern:*

Be it known that I, LEO ANSCHEL, engineer, a subject of the German Emperor, and residing at Dortmund, Germany, have invented certain new and useful Improvements in Rotating Disk Cutting - Machines, of which the following is a specification.

The known disk cutting machines with rotating circular cutter for cutting meat and the like, have the disadvantage, that the meat will be easily jammed when reaching the cutter blade. Various devices and arrangements have been designed for obviating this difficulty. So the cutter blade has been made with a conical or spherical surface or has been placed with its axis at an angle to the direction of feed of the stuff. Similarly it has been attempted to give the meat a curved line of feed and the cutter has been in such instance arranged tangentially to the feed curve. However all these devices are more or less complicated and do not allow of an effective simplification of the disk cutting machine, as is necessary for its general introduction.

The present invention refers to the solution of this difficulty, to avoid the stuff being jammed at the cutter surface and the braking action caused thereby on the rotation of the blade, and consists in a loosely revolving disk being arranged flush within the annular cutter blade. The stuff will thus after having been cut reach the inside loose disk after having passed the annular cutter proper, and the loose inside disk will thereby be stopped while the outside annular cutter can continue its rotation undisturbed. As now the stuff will reach the loose disk with a onesided pressure owing to the onesided guide the disk will obtain a speed of its own corresponding to the rate of feed whereby the friction between the stuff and the loose disk will be greatly reduced, so much the more, as independently of the direction of rotation of the cutter, the rotation of the loose disk will be reversed on the stuff being withdrawn. This design of the cutter blade, with an outer cutting edge and an inside loosely rotating disk is of great importance for the small disk cutter machines with generally horizontally arranged cutter, in which the stuff is fed by hand on a stationary surface against the cutting edge and back again on to the said stationary surface. As in these machines it is necessary to feed the stuff along a stationary guide or fence in order to avoid its being carried away by the revolving cutter, the stuff can be brought with a certain one sided pressure on to the inside loose disk and be returned on the latter with very small torsional force to the original position on the guide table. Here thus the return of the stuff is effected without reversing the rotation of the inside disk.

In the accompanying drawing a mode of carrying out the invention is exemplified in application to a disk cutter machine of the simplest type.

Figure 1 is a longitudinal section. Fig. 2 is a plan view.

In the box shaped frame $a$ the table $c$ is arranged vertically adjustable and provided with side fences or guides $b$. Said table $c$ is raised and lowered by means of the set screws $f$ sliding on the ways $d$ and moved to and fro by means of the lever $e$. Such vertical adjustment is necessary for obtaining various thicknesses of cut, the thickness of which may be gaged by means of a division or scale provided on the stationary arc $g$. The annular cutter $i$, running with its axis $h$ in long bearings on frame $a$ behind the table $c$, is rotated by means of the bevel gear $k$ and $l$ from the crank $n$ in continuously the same sense of rotation. On the inside surface of this cutter $i$ the disk $q$, centered by means of pin $p$, and arranged flush with disk $i$, rotates loosely. When now cutter $i$ revolves, the disk $q$ will be carried along with it owing to the slight friction between the two, so that the disk $q$ will not grind against the cutter, as would be possible owing to the very small play allowable between them, neither will the disk $q$ vibrate or sing in consequence of such grinding. When however a piece of meat, say a ham, is moved as shown in the drawing at $r$, from the stationary table $c$ along the fence or guide $b$ over the cutter $i$, the slice cut off will fall down below and the ham will reach the disk $q$, on which it will rest, while the annular cutter $i$ may freely continue its rotation. Thus a braking effect on the drive or the cutter is avoided, and besides any possible vibrations, and a consequent singing of disk $q$ by grinding against the cutter $i$ is damped and stopped by the pressure of the meat on the disk $q$. As the width of the table $c$ is determined by the maximum size of stuff to be cut on the machine, generally however only small pieces are cut, the stuff will in the most instances reach the disk $q$ with a one sided pressure owing to the one sided guide $b$. If now the stuff $r$ is guided on along the beading $s$ of the guard $t$ covering the cutter $i$ in the same direction, it will without any exertion be returned by the disk $q$ back to the table $e$ and delivered here. The hand of the operator guiding the stuff has thus a much easier work, than when the stuff has to be advanced and returned in a straight line; furthermore the stuff is less severely treated by the disk $q$, as the latter causes merely a slight torsion.

Having thus described my invention what I claim and desire to secure by Letters Patent of the United States is:

In a meat cutting machine the combination with a rotating annular cutter having an outer cutting edge of a central disk being loosely pivoted on the cutter and arranged flush with the surface of the latter, substantially as set forth.

In testimony whereof, I affix my signature in the presence of two witnesses.

LEO ANSCHEL. [L. S.]

Witnesses:
OTTO KÖNIG,
WILLY KLEIN.